United States Patent
Pisklak et al.

(10) Patent No.: US 9,869,155 B2
(45) Date of Patent: *Jan. 16, 2018

(54) YIELDING OF HYDRATED LIME IN SET-DELAYED AND OTHER SETTABLE COMPOSITIONS

(71) Applicant: Halliburton Energy Services, Inc., Houston, TX (US)

(72) Inventors: Thomas Jason Pisklak, Cypress, TX (US); Samuel J. Lewis, Spring, TX (US); Kyriacos Agapiou, Houston, TX (US); Peter James Bou, Houston, TX (US); Pauline Akinyi Otieno, Spring, TX (US); Lance Everett Brothers, Chickasha, OK (US); Ronnie Glen Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/910,886

(22) PCT Filed: Sep. 9, 2013

(86) PCT No.: PCT/US2013/058711
§ 371 (c)(1),
(2) Date: Feb. 8, 2016

(87) PCT Pub. No.: WO2015/034531
PCT Pub. Date: Mar. 12, 2015

(65) Prior Publication Data
US 2016/0194545 A1      Jul. 7, 2016

(51) Int. Cl.
*E21B 33/13* (2006.01)
*E21B 21/06* (2006.01)
(Continued)

(52) U.S. Cl.
CPC .......... *E21B 33/13* (2013.01); *B28C 5/34* (2013.01); *B28C 7/028* (2013.01); *C04B 28/02* (2013.01);
(Continued)

(58) Field of Classification Search
None
See application file for complete search history.

(56) References Cited

U.S. PATENT DOCUMENTS 3,467,193 A * 9/1969 Messenger ............ C04B 14/062
166/292
3,936,408 A * 2/1976 Adams .................... C04B 24/16
106/725

(Continued)

OTHER PUBLICATIONS

Rao, M. A.; Rheology of Fluid, Semisolid, and Solid Foods; 2014; Chapter 2; pp. 27-36.*

(Continued)

*Primary Examiner* — Anuradha Ahuja
(74) *Attorney, Agent, or Firm* — Craig W. Roddy; Tumey L.L.P.

(57) ABSTRACT

Methods and systems directed to controlling the rheology of settable compositions in subterranean formations. Embodiments include a method of controlling the rheology of a set-delayed cement composition, the method comprising: providing a set-delayed cement composition comprising water, pumice, hydrated lime, and a set retarder; shearing the set-delayed cement composition in an amount sufficient to substantially prevent solids settling; storing the set-delayed cement in a pumpable fluid state for at least 1 day; activating the set-delayed cement composition; introducing the set-delayed cement composition into a subterranean formation; and allowing the set-delayed cement composition to set in the subterranean formation. Additional methods and systems are also provided.

20 Claims, 2 Drawing Sheets

(51) Int. Cl.

| | | |
|---|---|---|
| *C09K 8/46* | (2006.01) | |
| *C04B 28/02* | (2006.01) | |
| *C09K 8/467* | (2006.01) | |
| *C04B 28/04* | (2006.01) | |
| *C04B 28/06* | (2006.01) | |
| *C04B 28/08* | (2006.01) | |
| *C04B 28/14* | (2006.01) | |
| *C04B 28/34* | (2006.01) | |
| *B28C 5/34* | (2006.01) | |
| *B28C 7/02* | (2006.01) | |
| *C04B 28/10* | (2006.01) | |
| *E21B 33/14* | (2006.01) | |

(52) U.S. Cl.
CPC ............. *C04B 28/04* (2013.01); *C04B 28/06* (2013.01); *C04B 28/08* (2013.01); *C04B 28/10* (2013.01); *C04B 28/14* (2013.01); *C04B 28/34* (2013.01); *C09K 8/46* (2013.01); *C09K 8/467* (2013.01); *E21B 21/062* (2013.01); *E21B 33/14* (2013.01); *Y02W 30/95* (2015.05)

(56) References Cited

U.S. PATENT DOCUMENTS

| | | | | |
|---|---|---|---|---|
| 4,036,301 | A * | 7/1977 | Powers | C04B 20/1018 106/622 |
| 4,462,837 | A * | 7/1984 | Baker | C04B 24/383 106/720 |
| 4,676,832 | A | 7/1987 | Childs et al. | |
| 4,726,219 | A * | 2/1988 | Pearson | E21B 43/26 73/152.39 |
| 5,175,277 | A * | 12/1992 | Rakitsky | C12P 19/04 106/729 |
| 5,289,877 | A * | 3/1994 | Naegele | E21B 33/13 166/285 |
| 5,322,389 | A * | 6/1994 | Smith | B09B 1/008 405/129.3 |
| 5,989,336 | A * | 11/1999 | Carpenter | C04B 14/104 106/718 |
| 6,106,603 | A * | 8/2000 | Skaggs | C04B 40/0035 106/172.1 |
| 6,167,912 | B1 * | 1/2001 | Stephens | F16L 55/175 138/140 |
| 6,874,353 | B2 | 4/2005 | Johnson et al. | |
| 7,201,288 | B2 | 4/2007 | Robb et al. | |
| 2004/0211342 | A1 | 10/2004 | Sprouts et al. | |
| 2006/0081155 | A1 | 4/2006 | Chatterji et al. | |
| 2008/0060811 | A1 * | 3/2008 | Bour | C04B 26/04 166/291 |
| 2008/0060820 | A1 * | 3/2008 | Bour | C04B 26/04 166/386 |
| 2008/0156225 | A1 | 7/2008 | Bury | |
| 2010/0044043 | A1 * | 2/2010 | Roddy | C04B 28/021 166/294 |
| 2010/0155772 | A1 | 6/2010 | Woodmansee | |
| 2010/0157720 | A1 * | 6/2010 | Woodmansee | B01F 3/1242 366/6 |
| 2010/0258310 | A1 * | 10/2010 | James | C04B 28/18 166/277 |
| 2011/0297378 | A1 * | 12/2011 | Reddy | C09K 8/467 166/293 |
| 2012/0090841 | A1 * | 4/2012 | Reddy | C04B 24/38 166/293 |
| 2012/0192768 | A1 * | 8/2012 | Ravi | C04B 28/02 106/694 |
| 2013/0180716 | A1 * | 7/2013 | Lende | C09K 8/40 166/292 |
| 2013/0233538 | A1 * | 9/2013 | Chatterji | E21B 47/00 166/250.12 |
| 2014/0290943 | A1 * | 10/2014 | Ladva | E21B 43/267 166/280.1 |

OTHER PUBLICATIONS

International Search Report and Written Opinion for International Application No. PCT/US2013/058711 dated May 27, 2014.
HESS Pumice Products, Inc. "Fact Sheet", located at website www.hesspumice.com, printed from Internet Mar. 2012.
Halliburton Energy Services "SA-1015" information sheet dated 2012.
Halliburton Energy Services Micro Matrix cement retarder information sheet dated Aug. 2007.
Halliburton Energy Services CFR-3 cement friction reducer dispersant information sheet dated Oct. 2005.
Liquiment 5581F information sheet printed from Internet, dated 2013.
HESS Pumice Pozz for Well Cements dated Mar. 25, 2013.
Canadian Office Action for Canadian Application No. 2,919,434 dated Dec. 15, 2016.

* cited by examiner

YIELDING OF HYDRATED LIME IN SET-DELAYED AND OTHER SETTABLE COMPOSITIONS

BACKGROUND

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein and/or between the pipe string and a larger conduit disposed in the wellbore. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation and/or the larger conduit. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for at least about one day (e.g., at least about 7 days, about 2 weeks, about 2 years or more) at room temperature (e.g., about 80° F.) in quiescent storage. When desired for use, the set-delayed cement compositions should be capable of being activated whereby reasonable compressive strengths are developed. For example, a cement set activator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and high horsepower pumping equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions comprising lime may not develop a high enough yield point to sufficiently suspend the solids in the slurry. The yield point is the threshold shear stress that must be applied to create flow of a fluid. Yield stress or yield point of cementing compositions directly affects their performance, especially related to stability, friction and mud removal. For example, if the slurry does not reach a specific yield point, the slurry solids may segregate, and the slurry becomes unusable. This is a greater issue in set-delayed cement compositions than in non-set-delayed cement compositions, because set-delayed cement compositions may need to suspend their solids for an extended period of time. Slurry rheology may be improved by the addition of water viscosifying suspension additives. However, these additives may be expensive and may be incompatible with some formulations of set-delayed cement compositions.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
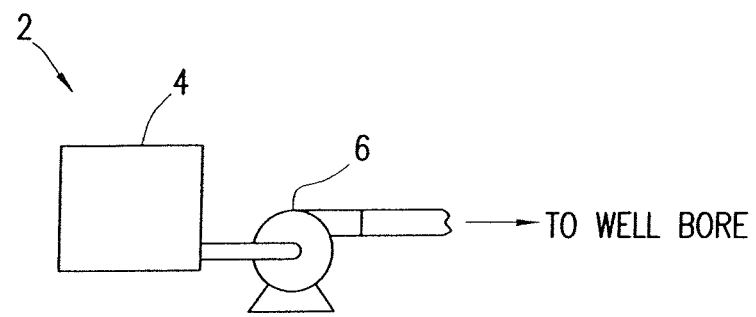
FIG. 1 illustrates a system for preparation and delivery of a settable composition to a wellbore in accordance with certain embodiments.

The present embodiments relate to subterranean cementing operations and, more particularly, in certain embodiments, to controlling the rheology of settable compositions in subterranean formations.

Embodiments of the settable compositions may comprise set-delayed cement compositions. Set-delayed cement compositions may generally comprise water, pumice, hydrated lime, and a set retarder. Optionally, the set-delayed cement compositions may further comprise a dispersant. Advantageously, embodiments of the set-delayed cement compositions may be capable of remaining in a pumpable fluid state for an extended period of time. For example, the set-delayed cement compositions may remain in a pumpable fluid state for at least about 1 day or longer (e.g., about 2 years or longer). Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 80° F. to about 200° F. In alternative embodiments, the set-delayed cement compositions may be used in subterranean formations having bottom static temperatures up to 450° F. or higher.

The water used in embodiments of the settable compositions may be from any source provided that it does not contain an excess of compounds that may undesirably affect other components in the settable compositions. For example, a settable composition may comprise fresh water, salt water, or water produced from oil and/or gas production. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the settable compositions in an amount in the range of from about 33% to about 200% by weight of the pumice or other settable material. In certain embodiments, the water may be present in the settable compositions in an amount in the range of from about 35% to about 70% by weight of the pumice or other settable material. A smaller amount of water may be used for set-delayed cement compositions than for other types of settable compositions. The less water in the settable composition, the greater the viscosity of the composition. This decrease in the amount of water may require additional process steps to obtain a suitable rheology for the suspension of solids, for example the settable compositions disclosed may be subjected to a higher rate of shear than normal; this method is discussed below. One of ordinary skill in the art with the benefit of this disclosure will recognize the appropriate amount of water for a chosen application.

Embodiments of the settable compositions may comprise pumice. Generally, pumice is a volcanic rock that can exhibit cementitious properties, in that it may set and harden in the presence of hydrated lime and water. The pumice may also be ground. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 micron, from about 5 microns to about 100 microns, or from about 10 micron to about 50 microns. In one particular embodiment, the pumice may have a mean particle size of less than about 15 microns. An example of a suitable pumice is available from Hess Pumice Products, Inc., Malad, Id., as DS-325 lightweight aggregate, having a d50 mean particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for use for a chosen application.

Embodiments of the settable compositions may comprise hydrated lime. As used herein, the term "hydrated lime" will be understood to mean calcium hydroxide. The hydrated lime may be included in embodiments of the settable compositions, for example, to form a hydraulic composition with the pumice. For example, the hydrated lime may be included in a pumice-to-hydrated-lime weight ratio of about 10:1 to about 1:1 or about 3:1 to about 5:1. Where present, the hydrated lime may be included in the settable compositions in an amount in the range of from about 1% to about 100% by weight of the pumice or other settable material, for example. In some embodiments, the hydrated lime may be present in an amount ranging between any of and/or including any of about 10%, about 20%, about 40%, about 60%, about 80%, or about 100% by weight of the pumice or other settable material. In some embodiments, the cementitious components present in the settable composition may consist essentially of the pumice and the hydrated lime. For example, the cementitious components may primarily comprise the pumice and the hydrated lime without any additional components or combination of components (e.g., Portland cement, fly ash, slag cement) that hydraulically set or otherwise harden in the presence of water. One of ordinary skill in the art, with the benefit of this disclosure, will recognize the appropriate amount of hydrated lime to include for a chosen application.

As discussed above, settable compositions may experience rheological problems over the duration of the storage period if not properly prepared. These problems may be due to the lower amount of water used in the compositions or the concentration of hydrated lime in the composition. One such problem may be the settling of solids in embodiments comprising set-delayed cement compositions. If the solids are not adequately suspended in the composition, the composition may segregate and be unusable. This is a greater issue in set-delayed cement compositions than in non-set-delayed cement compositions, because set-delayed cement compositions may need to suspend their solids for an extended period of time. Methods to counteract this issue may include the use of water viscosifying suspension additives such as polymeric additives or frequent agitation to maintain the solids suspension. Examples may include any viscosifier formulated in the optimal amount and/or polysaccharide biopolymer sub-groups including: scleroglucan, carragenans, xanthan, welan, diutan gums, celluloses, hydroxyl ethyl celluloses as well as alternatives such as: synthetic polymer viscosifiers, e.g. high molecular weight acrylamide polymers, acrylic acid-acrylamide co-polymers, and acrylamide co-polymers. However, these solutions are expensive and time-consuming. An example of a suitable water viscosifying suspension additive includes SA-1015™ suspending agent, available from Halliburton Energy Services, Inc. Advantageously, and as described below, these methods may be unnecessary if the composition containing the hydrated lime is sheared properly.

Some embodiments of the settable compositions comprising lime may be classified as a dilatant fluid at low shear levels. Without being limited by theory, it is believed that the shear-thickening tendency of the settable compositions may due to particle jamming effects between the pumice and/or hydrated lime particles, while the effective viscosity of the interstitial fluid is not sufficient to cushion or buffer the collision between these particles. However, as set forth in this disclosure, if the settable compositions comprise a sufficient amount of yield stress or and/or interstitial fluid viscosity, the embodiments comprising hydrated lime may become thixotropic or pseudo-plastic and also may be capable of maintaining the solids suspension over an extended period of time. In embodiments, a sufficient amount of shear history is imparted to the settable compositions, and the compositions may be able to suspend pumice and/or other large particles for an extended amount of time without the use of water viscosifying suspension additives, re-agitation of the compositions, or any other process known to aid in particle suspension. Therefore, unlike Newtonian fluids or fluids that consistently behave as pseudo-plastic or thixotropic, the dilatant nature of some of the settable compositions observed at low rates of shear may require that a higher rate of shear be applied than what is typically used in other operations. If sheared sufficiently, the settable compositions may reach a sufficient yield point capable of maintaining a solids suspension for an extended amount of time. Sufficient shearing imparts viscous dissipation energy and can substantially prevent the settling of solids such that at least 99% of solids by volume will not settle upon the quiescent storage of the settable compositions over a 24-hour period. In embodiments, the hydrated lime of the settable compositions is sheared at a sufficient rate as described below.

The power inputted to shear the lime-containing settable compositions may be represented by the viscous dissipation function (VDF). The VDF is the product of the volume average shear rate and the volume average shear stress. In embodiments, the settable compositions may be non-Newtonian fluids. The Herschel-Bulkley (HB) VDF model may be used to model these compositions. VDF can be approximated for a Herschel-Bulkley fluid by using the following equation:

$$VDF = [k_1 * RPM * (\tau_{Ohb}) + \mu_{\infty hb} * (k_1 * RPM)^{(1+n,hb)}]$$

Where $k_1$ is the shear rate constant, $\tau_{Ohb}$ is the yield point of the HB fluid, $\mu_{\infty hb}$ is the HB consistency coefficient of the fluid, and n,hb is the shear thinning index of a Herschel-Bulkley fluid and approximates the average of all the log-log slopes of shear stress vs. shear rate data at each RPM. $k_1$ is a conversion of RPMs to shear rate for each individual viscometer or mixer (large batch mixer, circulating pump, etc.) and is unique to viscometer or mixer design. Typically $k_1$ may be determined by using multiple Newtonian standards (ns) and multiple Power Law (shear thinning) standard (pls) fluids with known flow consistency (K) and flow behavior indices (n). Then multiple regression analysis is used to maximize the regression fit to each of the functions below:

$VAAV,ns1=(k2*Torque)/(k1*RPM)$ (Data collected for Newtonian Standard #1, with a known viscosity of VIS#1)

$VAAV,ns2=(k2*Torque)/(k1*RPM)$ (Data collected for Newtonian Standard #2, with a known viscosity of VIS#2)

$VAAV,pls1a=(k2*Torque)/(k1*RPM)$ (Data collected for Power Law Standard #1)

$VAAV,pls1b=K1(k1*RPM)^{\wedge}(n1-1)$ ((Data collected for Power Law Standard #1, with known $K1$ and $n1$)

$VAAV,pls2a=(k2*Torque)/(k1*RPM)$ (Data collected for Power Law Standard #2)

$VAAV,pls2b=K2(k1*RPM)^{\wedge}(n2-1)$ (Data collected for Power Law Standard #2, with known $K2$ and $n2$).

By using step-wise or equivalent regression analysis, k1 and k2 may be determined by best fitting all of the following functions: VAAV, ns1=VIS#1; VAAV, ns2=VIS#2; VAAV, pls1a=VAAV, pls1b; and VAAV, pls2a=VAAV, pls2b.

An appropriate amount of power must be input in order to sufficiently shear the settable compositions for extended solids suspension. The amount of power needed to yield the lime is a function of the lime concentration, the amount of water present, and the size and concentration of the particles requiring suspension. Without being limited by theory, as a sufficient amount of power is input to yield the lime, the yielded lime will increase the effective viscosity of the interstitial fluid or paste between the suspending particles and thus increase the yield point of the fluid. One method to determine if a sufficient amount of power has been input is to solve for the log-log slope (LLS), which is also known as the local flow behavior index at a given shear or rpm as shown below:

$$LLS \text{ at } RPM, i=[Log(Torque, i+1/Torque, i)]/[Log(RPM, i+1/RPM, i)]$$

LLS is the slope of a shear stress vs. shear rate curve in log-log space. LLS may also be approximated by fitting the data to the Herschel-Buckley model of apparent viscosity shown in the following equation:

$$\eta = [\tau_{Ohb}/\gamma] + \mu_{\infty hb}(\gamma)^{n,hb-1}$$

Where $\eta$ is the apparent viscosity, $\tau_{Ohb}$ is the yield point, $\gamma$ is the viscometric shear rate, $\mu_{\infty hb}$ is the consistency coefficient, and n,hb is the shear thinning index of a Herschel-Bulkley fluid and approximates the average of all the LLS's at each RPM. If the LLS is a value less than 1, the fluid is a shear-thinning or pseudo-plastic fluid in that shear rate region. If the LLS value is greater than 1, the fluid is a dilatant or shear-thickening fluid. Present embodiments utilize settable compositions that have been sheared at a sufficiently high rate until the value of their respective LLS approaches or is less than about 1. If the shear rates applied to the lime is too low, the slurry may develop dilatant tendencies and may thicken under the low shear rate. This thickening of the settable compositions may create field handling issues. Additionally, the settable compositions may not suspend the slurry solids sufficiently. In present embodiments, a set-delayed or other settable composition comprising lime, having a sufficiently low value for n will preclude the need for other suspension aids.

Present embodiments comprise compositions with LLS values in the range of from about 1.05 or lower. In specific embodiments, the LLS value may range between any of and/or include any of about 1.05, about 1.00, about 0.90, about 0.80, about 0.70, about 0.60, or lower. One of ordinary skill in the art, with the benefit of this disclosure, will recognize the appropriate LLS value for a composition to be used for a given application.

In embodiments, an alternative method to determine the LLS is to calculate the slope of the shear stress (VASS) vs. shear rate (VASR) relationship in log-log space. It is a direct measurement of the shear thickening (dilatancy) or shear thinning (pseudo-plasticity) of the fluid at that shear rate. The LLS can be measured for a specific shear rate using the equation below:

$$LLS, i+1 = \{\log[(VASS, i+1)/(VASS, i)]\}/\log[(VASR, i+1)/(VASR, i)]$$

Where LLS is the log-log slope, VASS is the volume average shear stress, and VASR is the volume average shear rate. A decrease in the LLS of 25% or more may be sufficient to yield the hydrated lime.

Present embodiments comprise lime yielded compositions with a decrease in the LLS of from about 25% or greater. In specific embodiments, the LLS may decrease by about 25%, about 35%, about 45%, about 55%, about 65%, or greater. One of ordinary skill in the art, with the benefit of this disclosure, will recognize the appropriate reduction in the LLS value to know whether a composition may be used for a given application.

In embodiments, an alternative method to determine whether a settable composition has achieved a sufficient yield point is to calculate the residual stress of the settable composition. The residual stress of the settable composition may be measured by using a viscometer among other methods. For example, the residual stress of a composition may be calculated using a Fann Model 35 Six Speed viscometer with a Fann Yield Stress Adapter, both products are available from the Fann Instrument Company of Houston, Tex. The residual stress may be measured according to the formula:

$$RS = [(k_2)(3D+6D)]/2$$

Where RS is the residual stress, $k_2$ is the shear stress or torque coefficient, 3D and 6D are the Fann Model 35 torque readings taken 15 seconds after turning off the rotor, which had been running at 3 and 6 rpm respectively. $k_2$ is a constant unique to each mixer based on geometry, mixer size, etc. $k_2$ may be calculated for a mixer or viscometer by the method given above.

Present embodiments comprise lime yielded settable compositions with residual stress in the range of from about a 2 fold increase to about a 20 fold increase. This range encompasses every number in-between. In specific embodiments, the residual stress may increase by a fold of about 2, about 4, about 6, about 16, about 18, or about 20. One of ordinary skill in the art, with the benefit of this disclosure, will recognize the appropriate amount of residual stress necessary for a settable composition to be used for a given application.

In embodiments, an additional alternative method to determine whether the lime in a settable composition has yielded is to calculate the volume average apparent viscosity (VAAV) of the settable composition. As the lime is yielded, the suspension ability of the composition may increase; likewise the VAAV should also increase. VAAV may be calculated using the equation below:

$$VAAV=[(1000)(k_2)(\text{Torque at 100 rpm})]/(k_1)(100 \text{ rpm})$$

$k_1$ and $k_2$ are described above. 100 rpm may be chosen as the shear rate because a shear rate of 100 rpm when using the Fann Model 35 Six Speed viscometer with a Fann Yield Stress Adapter is the same order of magnitude as would be experienced in cementing oil and gas wells. An increase in the VAAV of 35% or more may be sufficient for a composition.

Present embodiments comprise lime yielded compositions with an increase in the VAAV of from about 35% or greater. In specific embodiments, the VAAV may increase by about 35%, about 45%, about 65%, about 150%, about 250%, or greater. One of ordinary skill in the art, with the benefit of this disclosure, will recognize the appropriate increase in the VAAV to know whether a settable composition may be used for a given application.

The shearing of the hydrated lime is not as simple as mixing the lime in a tank with paddles. Generally, higher levels of shear are required than can be generated with such equipment. In embodiments, a circulating pump or other type of mechanism may be required to adequately shear the lime while recirculating the slurry. Examples of pump types may include centrifugal pumps, API process pumps, canned motor pumps, chopper pumps, magnetic drive pumps, slurry pumps, positive displacement pumps, concrete pumps, diaphragm pumps, piston pumps, screw pumps, and vane pumps. Optionally, shear may be applied using a mixer, such as a ribbon blender, in-line static mixer, liquid pin mill, and a homogenizer, among others.

In embodiments, the compositions comprising lime may be recirculated in a tank through the use of a centrifugal pump or an equivalent alternative type of pumping device that inputs sufficient viscous dissipation energy. In order to adequately shear the settable compositions in the field, a high recirculation rate may be required. For example, the settable compositions may be recirculated at a rate of between about 300 gallons per minute (gpm) to about 800 gpm. In specific embodiments, the compositions may be recirculated at a rate of about 300 gpm, about 600 gpm, about 650 gpm, about 700 gpm, about 750 gpm, or about 800 gpm. In a laboratory setting a blender may be used to induce shearing of the lime. The blending may occur at speeds of about or greater than 2500 rpm. The time required to shear the settable compositions may vary with the concentration of lime used in the settable composition and the level of shear or viscous dissipation being imparted by the mixing or recirculating process. Moreover, the rate of shear generally should be high enough to induce the settable compositions into a shear-thinning state. Using low rates of shear produces dilatant settable compositions that may be unusable for some applications. Increasing the time of shear may not rectify the problem and may not induce the transition to a pseudo-plastic fluid if the shear rate is too low. One of ordinary skill in the art, with the benefit of this disclosure, should be able to select a shear rate to sufficiently shear the lime for a given application. There are multiple methods to quantify the amount of shear history being imparted, including but not limited to: the integral shear rate history; the amount of energy being imparted per unit volume of the liquid suspension; or the rate at which energy is being imparted per unit volume of material. These multiple methods can be used to scale up a mixing process from the lab scale to larger scale or full scale processes Advantageously, embodiments of the hydrated lime shearing techniques are not limited to settable compositions comprising pumice, such as the set-delayed cement compositions discussed above. The methods may be used by any settable composition, so long as the composition comprises a sufficient amount of lime. In embodiments, the hydrated lime shearing may be used in embodiments for compositions of Portland cements, pozzolanic cements, gypsum cements, soil cements, calcium phosphate cements, high-alumina content cements, silica cements, high-alkalinity cements, slag cements, cement kiln dust, or mixtures thereof. "Cement kiln dust," (CKD) as that term is used herein, refers to a partially calcined kiln feed which is typically removed from the gas stream and collected in a dust collector during the manufacture of cement. The chemical analysis of cement kiln dust from various cement manufactures varies depending on a number of factors, including the particular kiln feed, the efficiencies of the cement production operation, and the associated dust collection systems. Cement kiln dust generally may comprise a variety of oxides, such as $SiO_2$, $Al_2O_3$, $Fe_2O_3$, CaO, MgO, $SO_3$, $Na_2O$, and $K_2O$.

Embodiments of the settable compositions, as discussed above, may not include pumice. For example, embodiments may include a settable composition comprising fly ash, 20% hydrated lime by weight of the fly ash (bwoFA), 60% water bwoFA, and 0.06% retarder bwoFA. Alternative embodiments of the settable compositions may include pumice in addition to other settable components such as those discussed above. For example, embodiments may comprise a settable composition comprising pumice, 20% hydrated lime by weight of the pumice (bwoP), 10% class H Portland cement bwoP, 65% water bwoP, 0.06% retarder bwoP, 0.6% dispersant bwoP, and 2% weighting additive bwoP. Another embodiment comprises 20% pumice by weight of the pumice and CKD (bwoP+CKD), 80% CKD bwoP+CKD, 20% hydrated lime bwoP+CKD, 65% water bwoP+CKD, 0.06% retarder bwoP+CKD, 0.6% dispersant bwoP+CKD, and 2% weighting additive bwoP+CKD. Still another embodiment comprises 80% pumice bwoP+CKD, 20% CKD bwoP+CKD, 20% hydrated lime bwoP+CKD, 65% water bwoP+CKD, 0.06% retarder bwoP+CKD, 0.6% dispersant bwoP+CKD, and 2% weighting additive bwoP+CKD. Similar to the set-delayed cement composition embodiments, the aforementioned embodiments may preclude the need for suspension aids or additives such as water viscosifying suspension additives, for example: polymeric additives; or the re-agitation of the compositions.

Embodiments of the settable may comprise a set retarder. By way of example, set retarders may be used in the set-delayed embodiments. A broad variety of set retarders may be suitable for use in the settable compositions useful in the present embodiments. For example, the set retarder may comprise phosphonic acid, phosphonic acid derivatives, lignosulfonates, salts, organic acids, carboxymethylated hydroxyethylated celluloses, synthetic co- or ter-polymers comprising sulfonate and carboxylic acid groups, borate compounds, derivatives thereof, or mixtures thereof. Examples of suitable set retarders include, among others, phosphonic acid derivatives. One examples of a suitable set retarder is Micro Matrix® cement retarder, available from Halliburton Energy Services, Inc., of Duncan, Okla. Generally, the set retarder may be present in the settable composition used in the present embodiments in an amount sufficient to delay the setting for a desired time. In some embodiments, the set retarder may be present in the settable compositions in an amount in the range of from about 0.01% to about 10% by weight of the pumice or other settable material. In specific embodiments, the set retarder may be present in an amount ranging between any of and/or including any of about 0.01%, about 0.1%, about 1%, about 2%, about 4%, about 6%, about 8%, or about 10% by weight of the pumice or other settable material. One of ordinary skill in the art, with the benefit of this disclosure, will recognize the appropriate amount of the set retarder to include for a chosen application.

As previously mentioned, embodiments of the settable compositions may optionally comprise a dispersant. By way of example, dispersants may be used in the set-delayed embodiments. Examples of suitable dispersants include, without limitation, sulfonated-formaldehyde-based dispersants and polycarboxylated ether dispersants. One example of a suitable sulfonated-formaldehyde-based dispersant is a sulfonated acetone formaldehyde condensate. A specific example of a suitable dispersant is CFR™-3 dispersant, available from Halliburton Energy Services, Inc. One example of a suitable polycarboxylated ether dispersant is Liquiment® 5581F dispersant, available from BASF Corporation, Houston, Tex., that comprises a polycarboxylated ether. While a variety of dispersants may be used in accordance with present embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the settable compositions in an amount in the range of from about 0.01% to about 5% by weight of the pumice or other settable material. In specific embodiments, the dispersant may be present in an amount ranging between any of and/or including any of about 0.01%, about 0.1%, 0.5%, about 1%, about 2%, about 3%, about 4%, or about 5% by weight of the pumice or other settable material. One of ordinary skill in the art, with the benefit of this disclosure, will recognize the appropriate amount of the dispersant to include for a chosen application.

Other additives suitable for use in subterranean cementing operations also may be included in embodiments of the settable compositions. Examples of such additives include, but are not limited to, weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement composition after storing but prior to placement of the set-delayed cement composition into a subterranean formation. A person having ordinary skill in the art, with the benefit of this disclosure, will readily be able to determine the type and amount of additive useful for a particular application and desired result.

Those of ordinary skill in the art will appreciate that embodiments of the settable compositions generally should have a density suitable for a particular application. By way of example, the set-delayed cement compositions may have a density in the range of from about 4 pounds per gallon (lb/gal) to about 20 lb/gal. In certain embodiments, the settable compositions may have a density in the range of from about 8 lb/gal to about 17 lb/gal. Embodiments of the settable compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, embodiments of the settable compositions may have a delayed set in that they remain in a pumpable fluid state for an extended period of time. For example, the settable compositions may be set-delayed cement compositions that can remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or up to about 2 years. A fluid is considered to be in a pumpable fluid state where the fluid has a consistency of less than 70 Bearden units of consistency ("Bc"), as measured on a high-temperature high-pressure consistometer at room temperature (e.g., about 80° F.) in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with a cement set activator) to thereby set into a hardened mass. By way of example, embodiments of the set-delayed cement compositions may be activated to set to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days. After activation, the set-delayed cement composition may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement composition may develop a compressive strength in 24 hours of at least about 50 psi, at least about 100 psi, at least about 500 psi, or more. The compressive strengths may be determined in accordance with API RP 10B-2, *Recommended Practice for Testing Well Cements*, First Edition, July 2005, using an UCA at 140° F. while maintained at 3000 psi.

Embodiments may include addition of a cement set activator to the set-delayed cement compositions. Examples of suitable cement set activators include, but are not limited to, calcium chloride, triethanolamine, sodium silicate, zinc formate, calcium acetate, sodium hydroxide, a monovalent salt, nanosilica (i.e., silica having a particle size of less than or equal to about 100 nanometers), a polyphosphate, and combinations thereof. In some embodiments, a combination of the polyphosphate and a monovalent salt may be used for activation. The monovalent salt used may be any salt that dissociates to form a monovalent cation, such as sodium and potassium salts. Specific examples of suitable monovalent salts include potassium sulfate, calcium chloride, and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

The cement set activator should be added to embodiments of the set-delayed cement composition in an amount sufficient to activate the extended settable composition to set into a hardened mass. In certain embodiments, the cement set activator may be added to the set-delayed cement composition in an amount in the range of about 1% to about 20% by weight of the pumice. In specific embodiments, the cement set activator may be present in an amount ranging between any of and/or including any of about 1%, about 5%, about 10%, about 15%, or about 20% by weight of the pumice. One of ordinary skill in the art, with the benefit of this disclosure, will recognize the appropriate amount of the cement set activator to include for a chosen application.

As will be appreciated by those of ordinary skill in the art, embodiments of the settable compositions of the present embodiments may be used in a variety of subterranean operations, including primary and remedial cementing. In some embodiments, a settable composition may be provided that comprises water, pumice, hydrated lime, a set retarder, and optionally a dispersant. The settable compositions may be introduced into a subterranean formation and allowed to set therein. As used herein, introducing the settable composition into a subterranean formation includes introduction into any portion of the subterranean formation, including, without limitation, into a wellbore drilled into the subterranean formation, into a near wellbore region surrounding the wellbore, or into both. Embodiments may further include activation of a set-delayed cement composition. The activation of a set-delayed cement composition may comprise, for example, the addition of a cement set activator to the set-delayed cement composition.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or up to about 2 years. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

In primary cementing embodiments, for example, embodiments of the settable compositions may be introduced into a space between a wall of a wellbore and a conduit (e.g., pipe strings, liners) located in the wellbore, the wellbore penetrating the subterranean formation. The settable compositions may be allowed to set to form an annular sheath of hardened cement in the space between the wellbore wall and the conduit. Primary cement may also include introduction of the settable composition into a space between a conduit and a larger conduit in the wellbore. Among other things, the settable compositions may form a barrier, preventing the migration of fluids in the wellbore. The settable compositions also may, for example, support the conduit in the wellbore.

In remedial cementing embodiments, a settable composition may be used, for example, in squeeze-cementing operations or in the placement of cement plugs. By way of example, the settable composition may be placed in a wellbore to plug an opening, such as a void or crack, in the formation, in a gravel pack, in the conduit, in the cement sheath, and/or a microannulus between the cement sheath and the conduit.

An embodiment provides a method of controlling the rheology of a set-delayed cement composition, the method comprising: providing a set-delayed cement composition comprising water, pumice, hydrated lime, and a set retarder; shearing the set-delayed cement composition in an amount sufficient to substantially prevent solids settling; storing the set-delayed cement in a pumpable fluid state for at least 1 day; activating the set-delayed cement composition; introducing the set-delayed cement composition into a subterranean formation; and allowing the set-delayed cement composition to set in the subterranean formation.

Another embodiment for controlling the rheology of a settable composition comprises: providing a settable composition comprising water, hydrated lime, and a material selected from the group consisting of a Portland cement, a pozzolanic cement, a gypsum cement, a soil cement, a calcium phosphate cement, a high-alumina content cement, a silica cement, a high-alkalinity cement, a slag cement, cement kiln dust, pumice, and mixtures thereof; shearing the settable composition in an amount sufficient to substantially prevent solids settling; introducing the settable composition into the subterranean formation; and allowing the settable composition to set in the subterranean formation.

An embodiment provides a system for controlling the rheology of a set-delayed cement composition, the system comprising: a set-delayed cement composition comprising: water; pumice; hydrated lime; and a set retarder; and mixing equipment for shearing the set-delayed cement composition in an amount sufficient to substantially prevent solids settling in the set-delayed cement composition.

Referring now to FIG. 1, preparation of a settable composition in accordance with example embodiments will now be described. FIG. 1 illustrates a system 2 for preparation of a settable composition and delivery to a wellbore in accordance with certain embodiments. As shown, the settable composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore.

Figure 2A:
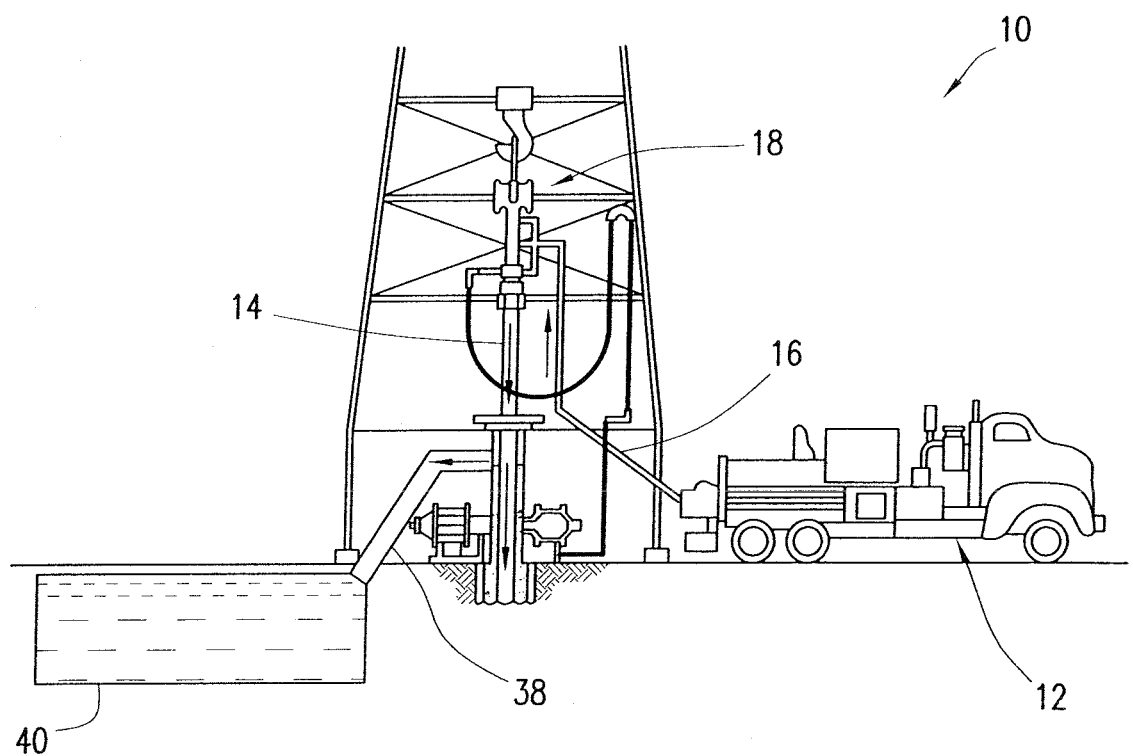
FIG. 2A illustrates surface equipment that may be used in placement of a settable composition in a wellbore in accordance with certain embodiments.

An example technique for placing a settable composition into a subterranean formation will now be described with reference to FIGS. 2A and 2B. FIG. 2A illustrates surface equipment 10 that may be used in placement of a settable composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a settable composition 14 through a feed pipe 16 and to a cementing head 18 which conveys the settable composition 14 downhole.

Figure 2B:
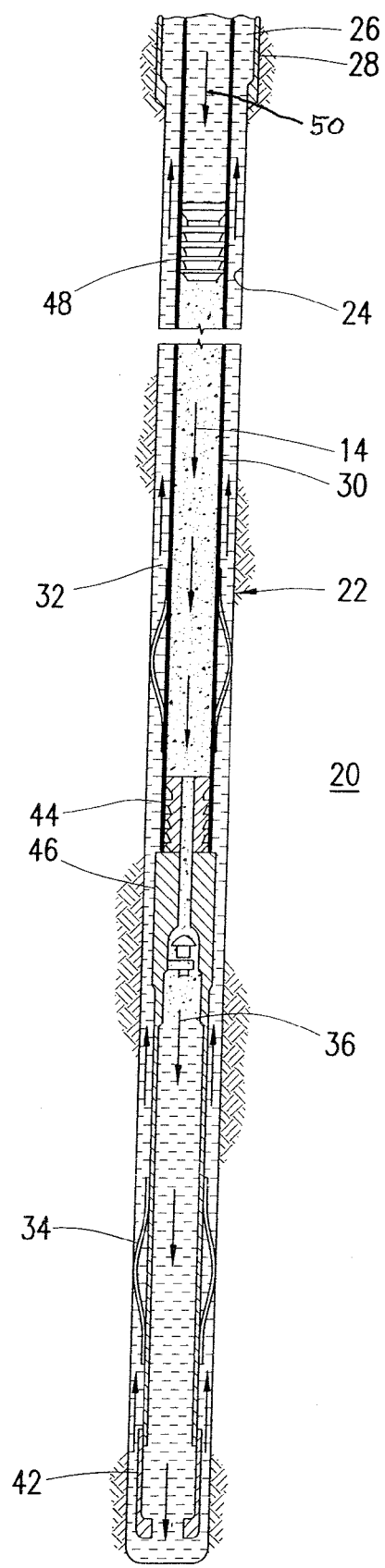
FIG. 2B illustrates placement of a settable composition into a wellbore annulus in accordance with certain embodiments.

Turning now to FIG. 2B, the settable composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the settable composition 14 may be pumped down the interior of the casing 30. The settable composition 14 may be allowed to flow down the interior of the casing 30 through the casing shoe 42 at the bottom of the casing 30 and up around the casing 30 into the wellbore annulus 32. The settable composition 14 may be allowed to set in the wellbore annulus 32, for example, to form a cement sheath that supports and positions the casing 30 in the wellbore 22. While not illustrated, other techniques may also be utilized for introduction of the settable composition 14. By way of example, reverse circulation techniques may be used that include introducing the settable composition 14 into the subterranean formation 20 by way of the wellbore annulus 32 instead of through the casing 30.

As it is introduced, the settable composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the settable composition 14, for example, to separate the settable composition 14 from the fluids 36 that may be inside the casing 30 prior to cementing. After the bottom plug 44 reaches the landing collar 46, a diaphragm or other suitable device should rupture to allow the settable composition 14 through the bottom plug 44. In FIG. 2B, the bottom plug 44 is shown on the landing collar 46. In the illustrated embodiment, a top plug 48 may be introduced into the wellbore 22 behind the settable composition 14. The top plug 48 may separate the settable composition 14 from a displacement fluid 50 and also push the settable composition 14 through the bottom plug 44.

The exemplary settable compositions disclosed herein may directly or indirectly affect one or more components or pieces of equipment associated with the preparation, delivery, recapture, recycling, reuse, and/or disposal of the disclosed settable compositions. For example, the disclosed settable compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary settable compositions. The disclosed settable compositions may also directly or indirectly affect any transport or delivery equipment used to convey the settable compositions to a well site or downhole such as, for example, any transport vessels, conduits, pipelines, trucks, tubulars, and/or pipes used to compositionally move the settable compositions from one location to another, any pumps, compressors, or motors (e.g., topside or downhole) used to drive the settable compositions into motion, any valves or related joints used to regulate the pressure or flow rate of the settable compositions, and any sensors (i.e., pressure and temperature), gauges, and/or combinations thereof, and the like. The disclosed settable compositions may also directly or indirectly affect the various downhole equipment and tools that may come into contact with the settable compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of certain aspects of some embodiments are given. In no way should the following examples be read to limit, or define, the entire scope of the embodiments.

Example 1

Sample set-delayed cement compositions were prepared that varied in the proportion of hydrated lime present. All other components were kept constant. The samples were prepared with the components present as a percentage of the weight of pumice (bwoP). Each sample comprised 100% pumice bwoP (DS-325 lightweight aggregate), 0.6% bwoP Liquiment® 5581F dispersant, 0.06% bwoP Micro Matrix® cement retarder, 2% bwoP MicroMax® Weight Additive available from Halliburton Energy Services, Houston, Tex., and 65% bwoP water. The 5% lime composition comprised hydrated lime in an amount of 5% bwoP. The 10% lime composition comprised hydrated lime in an amount of 10% bwoP. The 15% lime composition comprised hydrated lime in an amount of 15% bwoP. The 20% lime composition comprised hydrated lime in an amount of 20% bwoP.

The samples were first mixed in a Hobart mixer, which only mixes the samples and does not shear the settable compositions sufficiently to yield the lime. A portion of each sample was then removed and placed in a 50 ml graduated cylinder to measure the presence and amount of any solids that may settle out of suspension. A second portion was removed from the Hobart mixer and placed in a Warring blender, which does shear the lime sufficiently for yielding. The lime was sheared at 6000 rpms for varying amounts of time. Then a portion of each of the sheared samples was removed and placed in a 50 ml graduated cylinder so as to measure the presence and amount of any solids that settled out of suspension. Measurements were taken by using a Model 35A Fann Viscometer equipped with a Fann Yield Stress Adapter (FYSA) and a No. 1 spring, in accordance with the procedure set forth in API RP Practice 10B-2, *Recommended Practice for Testing Well Cements*. The results of this test are set forth in Table 1 below.

Example 1 thus indicates that for most readings, the set-delayed cement compositions that comprised higher lime concentrations could be sheared for less time and at a lower rate to develop a suspension that better suspends solids. This can be thought of as an inverse relationship, where the time to yield the lime decreases as the concentration of lime increases.

Example 2

The energy input of the sample set-delayed cement compositions of Example 1 was measured for each sample. The samples were not altered in their compositional makeup from Example 1. Each sample was mixed at 6000 rpm for the mixing time listed in table 2 below. Measurements were taken by using a Model 35A Fann Viscometer equipped with a Fann Yield Stress Adapter and a No. 1 spring, in accordance with the procedure set forth in API RP Practice 10B-2, *Recommended Practice for Testing Well Cements*. The results of this test are set forth in Table 2 below.

TABLE 1

Viscosity Tests

| % Lime | Time sheared at 6000 rpm. | Fann FYSA Readings | | | | | | | Volume Settled in 20 min. |
|---|---|---|---|---|---|---|---|---|---|
| | | 3 | 6 | 100 | 200 | 300 | 600 | 3D | 6D | |
| 5% | Hobart (NA) | 1 | 1 | 67.5 | 174.5 | 286 | >300 | 0 | 0 | 10 ml |
| | 150 sec. | 1 | 1 | 16 | 41.5 | 72.5 | 174 | 0 | 0 | 10 ml |
| | 684 sec. | 25 | 25 | 33.5 | 43 | 65 | 110 | 14 | 14 | 0 ml |
| 10% | Hobart (NA) | 1 | 2 | 70.5 | 184.5 | >300 | | 0 | 0 | 10 ml |
| | 150 sec. | 2 | 2 | 15.5 | 40.5 | 70 | 167 | 1.5 | 1.5 | 5 ml |
| | 455 sec. | 26 | 26.5 | 42 | 58.5 | 79.5 | 135 | 14 | 14 | 0 ml |
| 15% | Hobart (NA) | 1 | 2 | 65 | 187 | >300 | | 0 | 0 | 10 ml |
| | 150 sec. | 2 | 2 | 20.5 | 45 | 73.5 | 169 | 1 | 1.5 | 2.5 ml |
| | 340 sec. | 26 | 26 | 38.5 | 60.5 | 80.5 | 145 | 14 | 14 | 0 ml |
| 20% | Hobart (NA) | 1 | 2 | 65 | 187 | >300 | | 0 | 1 | 10 ml |
| | 150 sec. | 7 | 8.5 | 35.5 | 65 | 97 | 205 | 2 | 1 | 0 ml |
| | 228 sec. | 30.5 | 31 | 61 | 82.5 | 108.5 | 181 | 23 | 25 | 0 ml |

TABLE 2

Energy Input as a Function of Lime Concentration

| Lime Conc. (%) | $\tau_0$ (Pa) after 150 sec at 6,000 rpm | $\mu_\infty$ (cp) after 150 sec at 6,000 rpm | n after 150 sec at 6,000 rpm | Mixing Time at 6,000 rpm (sec) | Total Mixing Energy Input (J/cc) | Total Mixing Energy Input per unit of Lime (J/cc)/% lime |
|---|---|---|---|---|---|---|
| 5 | 0.55 | 125 | 1.37 | 684 | 544 | 109 |
| 10 | 1.24 | 115 | 1.37 | 455 | 451 | 45 |
| 15 | 1.1 | 251 | 1.22 | 340 | 329 | 22 |
| 20 | 4.3 | 755 | 1.03 | 228 | 227 | 11 |

Example 2 thus indicates that mixing energy input decreases as the lime concentration increases. Therefore, a lime composition suspension will require a lesser energy input for shearing at higher concentrations of lime than at lower concentrations of lime.

Example 3

Using the quantitative analysis methods described herein, the same sample set-delayed cement compositions of Example 1 were measured at shearing rates of 6000 rpm after 150 seconds and then measured again after yielding as described in Example 1. The samples were not altered in their compositional makeup from Example 1. Residual Stress analysis, Volumetric Average Apparent Viscosity analysis, and Log-Log Slope analysis were each performed. Measurements were taken by using a Model 35A Fann Viscometer and a No. 2 spring, in accordance with the procedure set forth in API RP Practice 10B-2, *Recommended Practice for Testing Well Cements*. The results of this test are set forth in Table 3 below.

TABLE 3

Quantitative Evidence of when Lime Yields

| Parameter | 5% Lime Before Yielding | 5% Lime After Yielding | 10% Lime Before Yielding | 10% Lime After Yielding | 15% Lime Before Yielding | 15% Lime After Yielding | 20% Lime Before Yielding | 20% Lime After Yielding |
|---|---|---|---|---|---|---|---|---|
| Residual Stress (Pa), RS | 0 | 9.52 | 1.02 | 9.52 | 0.85 | 9.52 | 1.02 | 16.32 |
| % Change in RS | | | | 833% | | 1020% | | 1500% |
| VAAV, 25 (cp) | 435 | 911 | 422 | 1,142 | 558 | 1,047 | 966 | 1,659 |
| % Increase in VAAV, 25 | | 109% | | 171% | | 88% | | 72% |
| 100/200 log-log slope | 1.38 | 0.36 | 1.39 | 0.48 | 1.13 | 0.65 | 0.87 | 0.44 |
| 200/300 log-log slope | 1.38 | 1.02 | 1.35 | 0.76 | 1.21 | 0.70 | 0.99 | 0.68 |
| 100/300 log-log slope | 1.38 | 0.60 | 1.37 | 0.58 | 1.16 | 0.67 | 0.91 | 0.52 |
| Avg. Log-Log Slope | 1.38 | 0.66 | 1.37 | 0.61 | 1.17 | 0.68 | 0.92 | 0.55 |
| % Reduced LLS | | −52% | | −56% | | −42% | | −41% |

Example 3 thus suggests that the change in the Residual Stress appears a 9 to 16 fold increase. Similarly, the % increase in the viscosity at 25 1/sec (VAAV,25) ranges from 72% to 171%. The Log-Log Slope method showed a 41% to 56% decrease in shear rate index, and for the 5%, 10% and 15% lime samples the LLS showed dilatant (shear thickening) behavior after 150 seconds at 6,000 RPM, before yielding. After yielding, the LLS values for the same 5%, 10%, and 15% lime samples dropped significantly below 1.0 after yielding, thus becoming shear thinning.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, the embodiments cover all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present embodiments. If there is any conflict in the usages of a word or term in this specification and one or more patent(s) or other documents that may be incorporated herein by reference, the definitions that are consistent with this specification should be adopted.

What is claimed is:

1. A method of controlling a rheology of a set-delayed cement composition, the method comprising:
providing a set-delayed cement composition comprising water, pumice, hydrated lime, and a set retarder, wherein the set-delayed cement composition has a pumice-to-hydrated-lime weight ratio of about 3:1 to about 5:1, wherein the set retarder is present in an amount of about 0.01% to about 2% by weight of the pumice;
shearing the set-delayed cement composition until a log-log-slope value is about 1.05 or lower to substantially prevent solids settling;
storing the set-delayed cement composition in a pumpable fluid state for at least 1 day;
activating the set-delayed cement composition;
pumping the set-delayed cement composition in a fluid state into a subterranean formation; and
allowing the set-delayed cement composition to set in the subterranean formation.

2. The method of claim 1 wherein the set-delayed cement composition is sheared by recirculating the set-delayed cement composition with a circulating pump.

3. The method of claim 2 wherein the set-delayed cement composition is recirculated at a rate between about 300 gallons per minute to about 800 gallons per minute.

4. The method of claim 1 wherein the log-log-slope is a slope of a shear stress vs. shear rate curve in log-log space.

5. The method of claim 1 wherein the set-delayed cement composition is sheared until the log-log-slope value is about 1.05 or lower and until the hydrated lime has yielded; wherein the lime has yielded when at least one condition is met; the at least one condition being selected from the group consisting of: the set-delayed cement composition has a residual stress increase of about 2 to about 20 fold, the set-delayed cement composition has an increase in volumetric average apparent viscosity of about 35%, and the set-delayed cement composition further has a reduction in the log-log-slope of about 25%; wherein the log-log-slope is a slope of a shear stress vs. shear rate curve in log-log space.

6. The method of claim 1 wherein the set-delayed cement composition is essentially free of water viscosifying suspension additives.

7. The method of claim 1 wherein the set retarder comprises at least one retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

8. The method of claim 1 wherein the set-delayed cement composition further comprises a dispersant selected from the group consisting of a sulfonated-formaldehyde-based dispersant, a polycarboxylated ether dispersant, and a combination thereof.

9. The method of claim 8 wherein the dispersant is the polycarboxylated ether dispersant, and the polycarboxylated ether dispersant is present in an amount of about 0.01% to about 2% by weight of the pumice.

10. The method of claim 1 wherein the activating the set-delayed cement composition step comprises adding a cement set activator to the set-delayed cement composition and the cement set activator comprises at least one cement set activator selected from the group consisting of calcium chloride, triethanolamine, sodium silicate, zinc formate, calcium acetate, sodium hydroxide, monovalent salt, sodium sulfate, nanosilica, polyphosphate, sodium hexametaphosphate, and any combination thereof.

11. A method of controlling a rheology of a settable composition, the method comprising:
providing a settable composition comprising water, hydrated lime, and a material selected from the group consisting of a Portland cement, a pozzolanic cement, a gypsum cement, a soil cement, a calcium phosphate cement, a high-alumina content cement, a silica cement, a high-alkalinity cement, a slag cement, cement kiln dust, pumice, and mixtures thereof, wherein the material is present in a material-to-hydrated-lime weight ratio of about 3:1 to about 5:1;
shearing the settable composition until a log-log-slope value is about 1.05 or lower to substantially prevent solids settling;
pumping the settable composition in a fluid state into a subterranean formation; and
allowing the settable composition to set in the subterranean formation.

12. The method of claim 11 wherein the settable composition is sheared by recirculating the settable composition with a circulating pump.

13. The method of claim 12 wherein the settable composition is recirculated at a rate between about 300 gallons per minute to about 800 gallons per minute.

14. The method of claim 11 wherein the log-log-slope is a slope of a shear stress vs. shear rate curve in log-log space.

15. The method of claim 11 wherein the settable composition is sheared until the log-log-slope value is about 1.05 or lower and until the hydrated lime has yielded; wherein the lime has yielded when at least one condition is met; the at least one condition being selected from the group consisting of: the settable composition has a residual stress increase of about 2 to about 20 fold, the settable composition has an increase in volumetric average apparent viscosity of about 35%, and the settable composition further has a reduction in the log-log slope of about 25%; wherein the log-log-slope is a slope of a shear stress vs. shear rate curve in log-log space.

16. The method of claim 11 wherein the settable composition is essentially free of water viscosifying suspension additives.

17. A system for controlling a rheology of a set-delayed cement composition, the system comprising:
a set-delayed cement composition comprising:
water;
pumice;
hydrated lime, wherein the set-delayed cement composition has a pumice-to-hydrated-lime weight ratio of about 3:1 to about 5:1; and
a set retarder, wherein the set retarder is present in an amount of about 0.01% to about 2% by weight of the pumice; and
mixing equipment configured to shear the set-delayed cement composition until a log-log-slope value is about 1.05 or lower to substantially prevent solids settling in the set-delayed cement composition; and
pumping equipment configured to pump the set-delayed cement composition in a fluid state into a wellbore.

18. The system of claim 17 wherein the mixing equipment comprises a circulating pump and wherein the circulating pump recirculates the set-delayed cement composition at a rate between about 300 gallons per minute to about 800 gallons per minute.

19. The system of claim 17 further comprising storage equipment for storage of the set-delayed cement composition; and a cement set activator for activation of the set-delayed cement composition, and wherein the cement set activator comprises at least one cement set activator selected from the group consisting of calcium chloride, triethanolamine, sodium silicate, zinc formate, calcium acetate, sodium hydroxide, monovalent salt, sodium sulfate, nanosilica, polyphosphate, sodium hexametaphosphate, and any combination thereof.

20. A method of controlling a rheology of a set-delayed cement composition, the method comprising:
providing a set-delayed cement composition comprising water, pumice, hydrated lime, a set retarder, and a dispersant, wherein the set-delayed cement composition has a pumice-to-hydrated-lime weight ratio of about 3:1 to about 5:1, wherein the set retarder is present in an amount of about 0.01% to about 2% by weight of the pumice, and wherein the dispersant is a polycarboxylated ether dispersant, and the polycarboxylated ether dispersant is present in an amount of about 0.01% to about 2% by weight of the pumice;
shearing the set-delayed cement composition until a log-log-slope value is about 1.05 or lower to substantially prevent solids settling;
storing the set-delayed cement composition in a pumpable fluid state for at least 1 day;
activating the set-delayed cement composition;
introducing the set-delayed cement composition into a subterranean formation; and
allowing the set-delayed cement composition to set in the subterranean formation.

* * * * *

UNITED STATES PATENT AND TRADEMARK OFFICE
CERTIFICATE OF CORRECTION

PATENT NO. : 9,869,155 B2
APPLICATION NO. : 14/910886
DATED : January 16, 2018
INVENTOR(S) : Thomas Jason Pisklak et al.

It is certified that error appears in the above-identified patent and that said Letters Patent is hereby corrected as shown below:

On the Title Page

Please delete:
"(72) Inventors: Thomas Jason Pisklak, Cypress, TX (US); Samuel J. Lewis, Spring, TX (US); Kyriacos Agapiou, Houston, TX (US); Peter James Bou, Houston, TX (US); Pauline Akinyi Otieno, Spring, TX (US); Lance Everett Brothers, Chickasha, OK (US); Ronnie Glen Morgan, Waurika, OK (US)"

And replace with:
-- (72) Inventors: Thomas Jason Pisklak, Cypress, TX (US); Samuel J. Lewis, Spring, TX (US); Kyriacos Agapiou, Houston, TX (US); Peter James Boul, Houston, TX (US); Pauline Akinyi Otieno, Spring, TX (US); Lance Everett Brothers, Chickasha, OK (US); Ronnie Glen Morgan, Waurika, OK (US) --

Signed and Sealed this
Twenty-ninth Day of May, 2018

Andrei Iancu
*Director of the United States Patent and Trademark Office*